United States Patent [19]

Nakashima et al.

[11] Patent Number: 4,702,665
[45] Date of Patent: Oct. 27, 1987

[54] METHOD AND DEVICE FOR DETERMINING THE REFERENCE POSITIONS OF AN INDUSTRIAL ROBOT

[75] Inventors: Seiichiro Nakashima; Kenichi Toyoda, both of Hino; Shigemi Inagaki, Kokubunji; Susumu Ito, Hino, all of Japan

[73] Assignee: Fanuc Ltd., Yamanashi, Japan

[21] Appl. No.: 711,919

[22] PCT Filed: Jul. 16, 1984

[86] PCT No.: PCT/JP84/00365
 § 371 Date: Mar. 11, 1985
 § 102(e) Date: Mar. 11, 1985

[87] PCT Pub. No.: WO85/00548
 PCT Pub. Date: Feb. 14, 1985

[30] Foreign Application Priority Data

Jul. 15, 1983 [JP] Japan .................. 58-127734

[51] Int. Cl.[4] .................................... B25J 9/00
[52] U.S. Cl. ........................ 414/730; 901/3; 901/50
[58] Field of Search ............ 901/2, 3, 50; 73/1 J; 414/730

[56] References Cited

U.S. PATENT DOCUMENTS

| | | | |
|---|---|---|---|
| 3,336,676 | 8/1967 | Aldeborgh | 73/1 J X |
| 3,496,758 | 2/1970 | Sunnen | 73/1 J |
| 4,372,721 | 2/1983 | Harjar et al. | 901/3 X |
| 4,406,069 | 9/1983 | Clement | 33/185 R |
| 4,481,592 | 11/1984 | Jacobs et al. | 901/3 X |

FOREIGN PATENT DOCUMENTS 0042960  1/1982  European Pat. Off.
1603673 11/1981  United Kingdom.

OTHER PUBLICATIONS

Article by Koliskor et al., entitled "Methods for Checking the Operating Accuracy of Industrial Robots", published by *Machines & Tooling*, vol. 49, No. 8, 1978, pp. 7-10.

*Primary Examiner*—Joseph E. Valenza
*Assistant Examiner*—Jay I. Alexander
*Attorney, Agent, or Firm*—Armstrong, Nikaido, Marmelstein & Kubovcik

[57] ABSTRACT

A method and a device for determining the reference positions of an industrial robot, in which datum surfaces (1a, 1b) are formed in the fixed base (1) of an industrial robot having a plurality of degrees of freedom of motion. The reference positions with respect to directions corresponding to the degrees of freedom of motion of the wrist base (5) and the wrist front section (7) are determined relatively to the fixed base (1) by means of a jig body (11) located fixedly on the datum surfaces, and measuring instruments (14 to 19) attached to the fixed base (1) at predetermined reference positions thereon, and the determined reference positions are given and taught to the NC unit of the industrial robot.

6 Claims, 11 Drawing Figures

METHOD AND DEVICE FOR DETERMINING THE REFERENCE POSITIONS OF AN INDUSTRIAL ROBOT

DESCRIPTION

1. Technical Field

The present invention relates to a method and a device for determining the reference positions of an industrial robot, more specifically to a method and a device capable of simply and highly precisely determining the reference positions of an industrial robot having a fixed base and a wrist front section of a plurality of degrees of freedom of motion relative to the fixed base.

2. Background Art

Industrial robots equipped with a wrist unit attached to the extremity of the robot arm, i.e., one of the motion systems, and having a plurality of degrees of freedom of motion relative to a fixed base have come into use. Industrial robots, in general, are numerically controlled according to a program, in which the wrist unit holding a robot work tool or a robot hand is controlled relative to the fixed base for predetermined working motions according to the program through the motion systems such as a swivel body, robot arms, and a wrist. Accordingly, it is necessary to determine the reference positions of the motion systems with respect to all the directions of motion corresponding to the degrees of freedom of motion of the industrial robot to make a program for numerically controlling the industrial robot. In the case of a six-axis articulated industrial robot, reference positions of the arms and other motion systems for motion about six axes must be determined.

According to a conventional method, the original position of the arm is a horizontal position determined by a level. This method, however, has the disadvantage that the unchanging determination of the original position of each arm with respect to the fixed base of the robot is difficult, when the floor surface on which the robot is installed is not horizontal.

According to another conventional method, marks or indices for indicating the reference positions or locating pins are provided on the corresponding ends of arms at the joint. This method, however, has the disadvantage that a large cumulative error in the position of the wrist unit results from the accumulation of errors in the alignment between the marks or locating pins.

The above-mentioned determination of reference positions of an industrial robot is necessary when the industrial robot is to be controlled by the use of the same program as has been used, after changing the industrial robot, after changing the part or parts of the motion system of the industrial robot or after dislocating the previous reference positions of the industrial robot by accidentally knocking the extremity of the robot arm against an obstacle. However, the above-mentioned conventional methods are unable to determine the reference positions simply and highly precisely.

DISCLOSURE OF THE INVENTION

Accordingly, in view of the disadvantages of the prior art, it is an object of the present invention to provide a method and a device capable of simply and highly precisely determining the reference positions of an industrial robot.

The object of the present invention is achieved by a method for determining the reference positions of an industrial robot having a fixed base and a wrist unit interlocked with the fixed base through motion systems and having a plurality of degrees of freedom of motion relative to the fixed base, comprising the steps of previously forming datum surfaces in the fixed base, attaching a reference position determining device having setting means for setting reference positions of the wrist unit for motions in a plurality of directions to the fixed base on the datum surfaces, providing the wrist unit with a gradual motion toward a position where the wrist unit front section is in contact with the setting means for setting reference positions and in alignment with respective reference positions, and giving information to the industrial robot to teach the reference positions with respect to the directions of motion corresponding to the degrees of freedom of motion of the industrial robot. This method is carried out by a device for determining the reference positions of an industrial robot having a fixed base, a movable robot unit including a movable body mounted on the fixed base and robot arms, and a wrist unit attached to the extremity of the movable robot unit and provided with a front section having a plurality of degrees of motion, comprising a reference position determining jig body capable of being located fixedly on datum surfaces formed in the fixed body at positions for determining the reference positions of the industrial robot and means attached to the reference position determining jig body for determining the reference positions of the front section of the wrist unit with respect to the directions of motion relative to the fixed base corresponding to the degree of freedom of motion.

BEST MODE FOR CARRYING OUT THE INVENTION

The invention will be described hereinafter with reference to a preferred embodiment thereof as applied to a six-axis articulated robot, in connection with the accompanying drawings.

Figure 1:
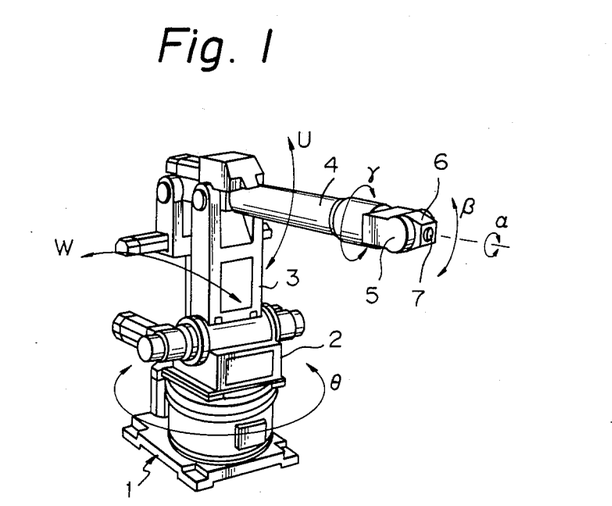
FIG. 1 is a general perspective view of a six-axis articulated industrial robot.

FIG. 1 shows a six-axis articulated robot. Referring to FIG. 1, a body unit 2 is rotatable relatively to a fixed base 1 about a vertical axis in directions indicated by a double-headed arrow $\theta$, while a first arm 3 is turnable relatively to the body unit 2 about a horizontal axis in directions indicated by a double-headed arrow W. A second arm 4 is turnable relatively to the first arm 3 about a horizontal axis in directions indicated by a double-headed arrow U. A base 5 of the wrist unit attached to the extremity of the second arm 4 is rotatable in directions indicated by a double-headed arrow $\gamma$ about the center axis of the second arm 4. An intermediate section 6 of the wrist unit is attached to the extremity of the wrist base 5 so as to be turnable about an axis perpendicular to the axis of rotation of the wrist base 5 in directions indicated by a double-headed arrow $\beta$. A front section 7 of the wrist unit is provided on the wrist intermediate section 6 so as to be rotatable about the own axis of rotation thereof in directions indicated by a double-headed arrow $\alpha$. Accordingly, the output end of this robot, namely, the wrist front section 7, is capable of moving through the motion system including the first arm 3, the second arm 4, and the wrist base 5 for rotation about six axes, that is, the wrist front section 7 has six degrees of freedom of motion. A robot work equipment, such as a robot hand, a welding head, or a spray gun, is attached to the wrist front section 7 for carrying out desired robot work.

Figure 2:
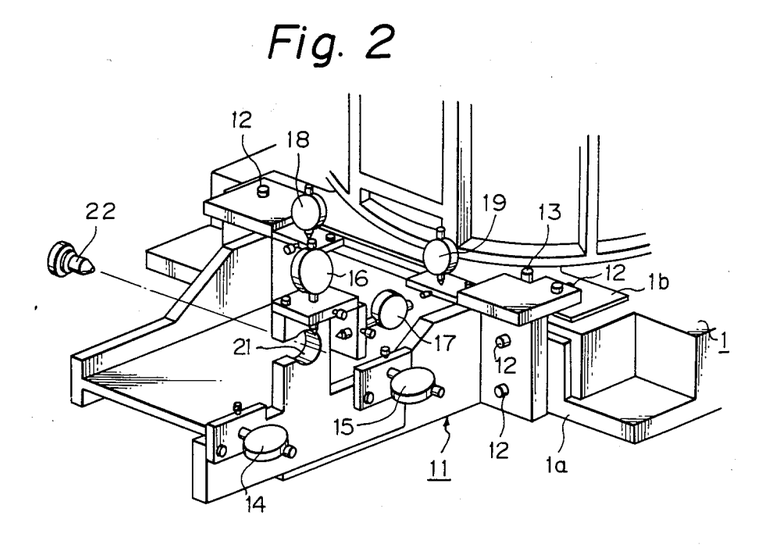
FIG. 2 is a general perspective view of a reference position determining device embodying the present invention as applied to the robot of FIG. 1.

In this embodiment, the reference position determining device according to the present invention has a jig body 11 capable of being located on the fixed base 1 of the robot as shown in FIG. 2. A vertical datum surface 1a and a horizontal datum surface 1b are formed previously in the fixed base 1 in the stage of manufacture and assembly of the robot. The jig body 11 is formed as a bracket structure adapted to be located accurately on the datum surfaces 1a and 1b and fixed to the fixed base 1 by bolts 12. A locating pin 13 is provided on the fixed base 1 for accurately locating the jig body 11 on the fixed base. In locating the jig body 11, the jig body 11 is pressed against the locating pin 13.

In the description given hereinbefore and to be given hereinafter, a horizontal direction is the direction parallel to the horizontal datum surface formed in the robot, namely, the direction parallel to the plane including the directions of rotation indicated by the arrow $\theta$, while the vertical direction and the longitudinal direction are the directions perpendicular to the horizontal datum surface of the robot. Accordingly, if the floor surface where the robot is installed is not horizontal, the horizontal datum surface of the robot does not coincide with a true horizontal plane, however, the discrepancy between the horizontal datum surface of the robot and a true horizontal plane does not cause any problem in the reference position determining operation at all.

Six measuring instruments, i.e., six dial gauges 14 to 19 in this embodiment, functioning as means to determine the reference positions of the output end of the robot for motions about the six axes are disposed at the respective reference positions. The dial gauges are the simplest reference position determining means, however, other similar measuring instruments, such as electronic micrometers, may be employed if necessary instead of the dial gauges.

Figure 10:
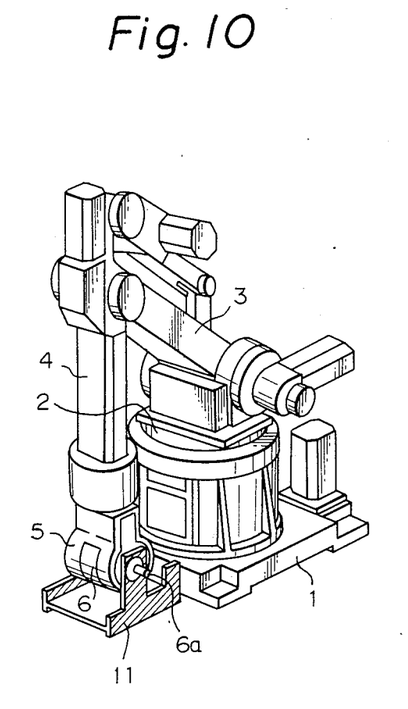
FIG. 10 is a schematic perspective view showing the attitude of a six-axis articulated industrial robot in determining the reference positions thereof.
Figure 11:
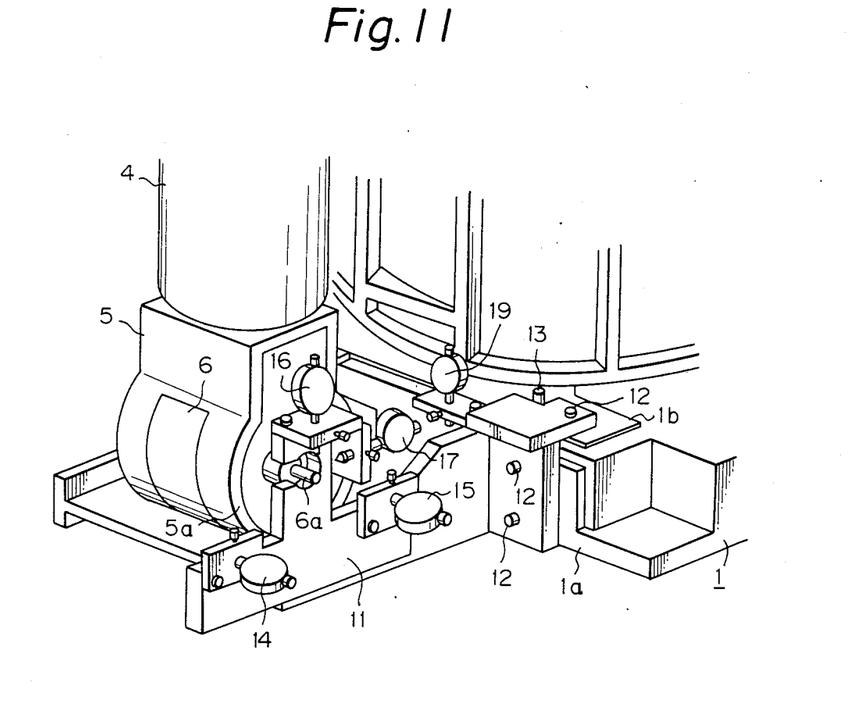
FIG. 11 is an enlarged fragmentary view of the robot of FIG. 10.

The reference positions of the robot are determined with reference to the wrist unit thereof; the attitude of the robot in determining the reference positions is shown in FIG. 10; and the relation of the wrist base 5 of the robot to the jig body 11 is shown in FIG. 11.

Figure 3:
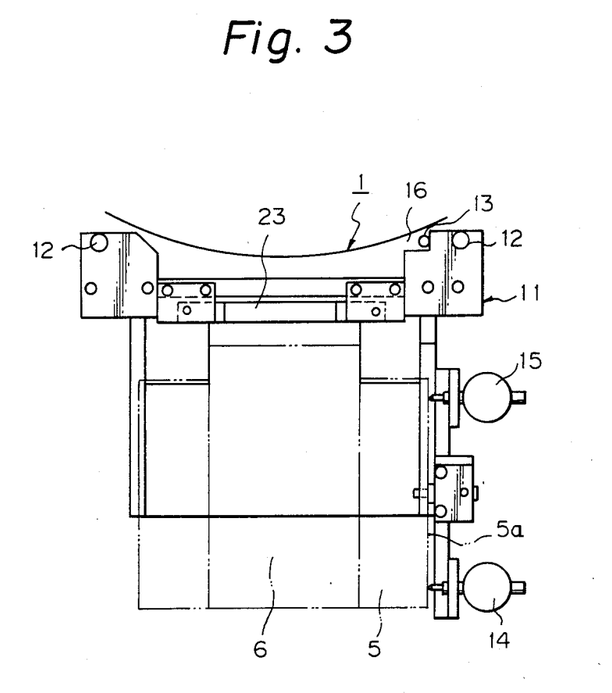
FIG. 3 is a schematic plan view of the reference position determining device of FIG. 2.

Referring to FIGS. 2, 3, and 11, a pair of dial gauges 14 and 15, among the six dial gauges, are provided on the side of the jig body 11 for determining reference positions of the wrist unit with respect to the directions indicated by the arrows $\theta$ and $\gamma$.

Figure 8:
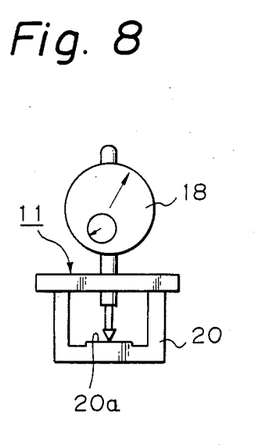
FIG. 8 is a front elevation of the essential part of the reference position determining device of FIG. 2.

The dial gauges 14 and 15 are calibrated beforehand by placing the respective measuring points on the reference surfaces 20a of a master block 20 as shown in FIG. 8. The side surface 5a of the wrist base 5 is brought into contact with the respective plungers of a pair of the dial gauges 14 and 15 as shown in FIG. 3 to determine the reference positions with respect to the $\theta$ directions and the $\gamma$ directions by turning the body unit 2 in the $\theta$ directions and turning the wrist unit in the $\gamma$ directions so that the respective indications on the dial gauges 14 and 15 coincide with the respective reference values. That is, the coincidence of the indications on the dial gauge 14 and 15 establishes the reference positions of the robot with respect to the $\theta$ directions and the $\gamma$ directions.

Figures 4, 5:
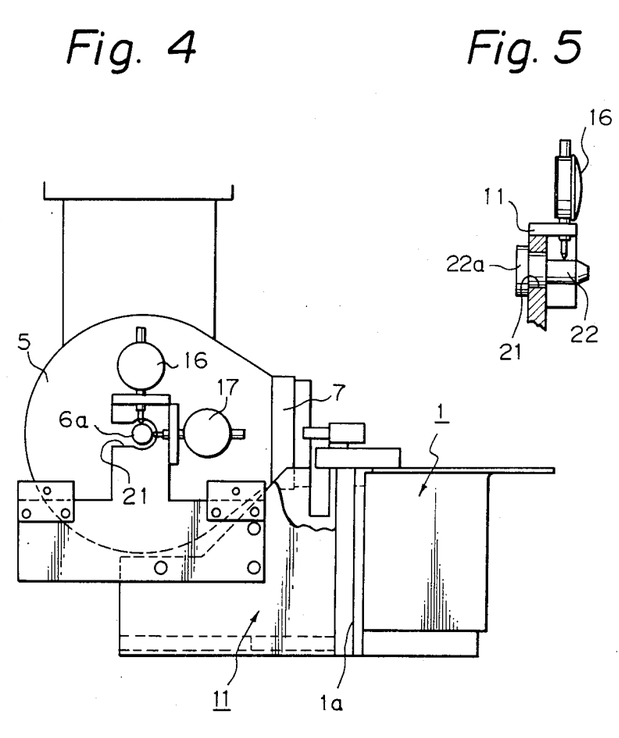
FIG. 4 is a schematic side elevation of the reference position determining device of FIG. 2.
FIG. 5 is a sectional view of the essential part of the reference position determining device of FIG. 2.

A pair of dial gauges 16 and 17 disposed perpendicularly to each other above the intermediate position between the dial gauges 14 and 15 are provided for determining the reference positions of the robot with respect to the W directions and the U directions. As shown in FIG. 4, a recess 21 for receiving the center shaft 6a of the rotation of the intermediate wrist unit 6 is formed in the side wall of the jig body 11. The dial gauge 16 is disposed so that the plunger thereof touches the shaft 6a vertically, while the dial gauge 17 is disposed so that the plunger thereof touches the shaft 6a horizontally.

As shown in FIG. 5, the dial gauges 16 and 17 are calibrated previously, namely reference values are set on the dial gauges 16 and 17, by inserting a master shaft 22 of the same diameter as that of the shaft 6a into the recess 21 so that the flange 22a is engaged in the recess 21.

Figure 7:
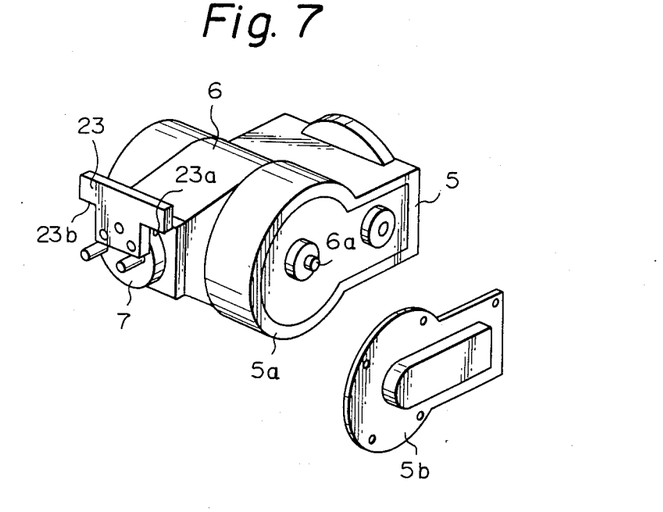
FIG. 7 is an exploded perspective view of the wrist unit of the robot of FIG. 1.
Figure 9:
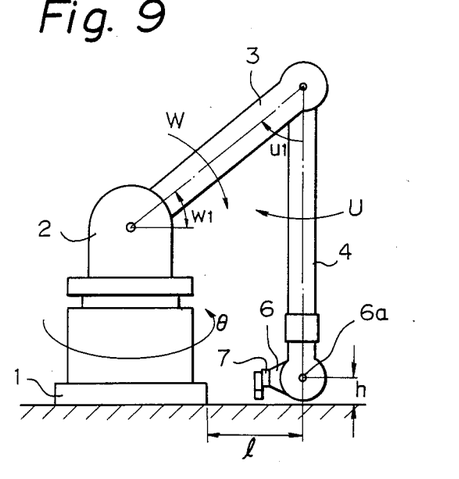
FIG. 9 is a view illustrating the relation between the angles of the arms and the position of the output end of the robot shown in FIG. 1.

After removing the master shaft 22 from the recess 21, the shaft 6a of the wrist unit is placed in the recess 21 so that the shaft 6a is in contact with the measuring points of the plungers of the dial gauges 16 and 17, and then the vertical and the horizontal positions of the wrist unit are adjusted so that the indications on the dial gauges 16 and 17 coincide with the corresponding reference values. Thus the positional adjustment of the wrist unit determines the reference height h and the horizontal distance l from the fixed base 1 of the wrist unit are determined. Hence, the reference angle $w_1$ of the first arm 3 to the body unit 2 and the reference angle $u_1$ of the second arm 4 to the first arm 3 are decided as shown in FIG. 9. Accordingly, the existing displacement of the arm from an original position of the robot determined appropriately beforehand can be known. The side cover 5b of the wrist base 5 is removed to expose the shaft 6a as shown in FIG. 7 for the reference position determining work.

A pair of the remaining dial gauges 18 and 19 are used for determining the reference positions of the wrist front section 7 with respect to the $\beta$ directions and $\alpha$ directions.

Figure 6:
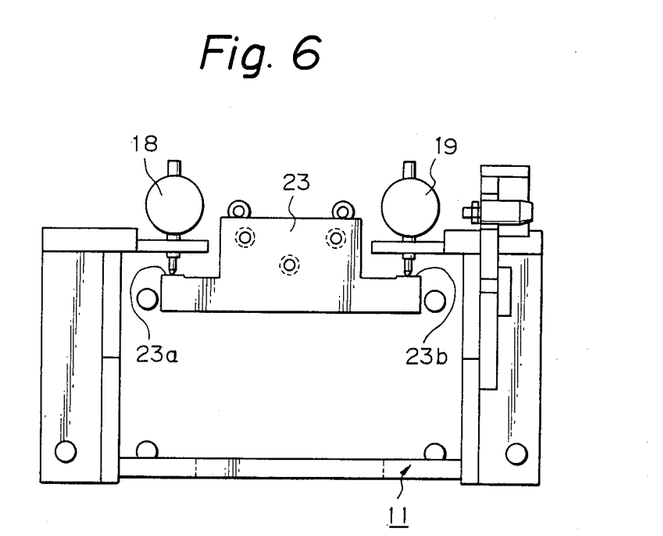
FIG. 6 is a schematic rear view of the reference position determining device of FIG. 2.

The respective reference values of the dial gauges 18 and 19 are set previously by using the master block 20 as shown in FIG. 8. A reference position determining jig 23 having two datum surfaces 23a and 23b is attached to the wrist front section 7 as shown in FIG. 7. Then, as shown in FIG. 6, the datum surfaces 23a and 23b of the jig 23 attached to the wrist front section 7 is brought into contact with the plungers of the dial gauges 18 and 19, and then the wrist front section 7 is moved together with the wrist intermediate section 6 for adjustment in the β directions so that the indications on the dial gauges 18 and 19 coincide with the corresponding reference values. Thus the reference position with respect to the β directions is determined.

On the other hand, the wrist front section 7 is turned in α directions for adjustment so that the respective indications on the dial gauges 18 and 19 with each other. Thus, the reference position with to α directions is determined.

The jig 23 can be attached to the wrist front section 7 by using holes formed in the wrist front section 7 for attaching a robot hand thereto.

Thus the reference positions of the output end of the six-axis articulated robot are determined highly accurately by adjusting the output end so that the indications on the six dial gauges mounted on the jig body 11 for setting the respective reference positions of the axes coincide with the corresponding reference values. After the completion of the determination of the reference positions of the robot, the reference positions of the axes are given and taught to an NC unit with the robot kept in the existing state, and then the device for determining the reference positions can be removed from the fixed base 1.

In case the robot is controlled by the use of the same program after changing any component of the motion system, such as the motor, with another or in case the reference positions of the robot have been dislocated due to an accidental interference between the robot and an external matter, the device for determining the reference positions of the present invention is attached again to the fixed base 1 to determine the reference positions of the output end of the robot. That is, once the reference positions of the output end of the robot are determined and the robot and the program stored in the NC unit are matched, the robot can be controlled again by the same program.

On the other hand, when the robot is replaced with a new robot of the same type and the new robot is required to be controlled by the use of the same program, the fixed base of the new robot is erected on the floor at the reference position, then the device for determining the reference positions of the present invention is attached to the fixed base, and then the reference positions of the output end of the robot are determined in the same procedure as mentioned above, and thereby the two individual robots can be matched to each other. Therefore, the same program applies to the new robot.

Although the present invention has been described with reference to a preferred embodiment thereof, the present invention is not limited to the mode of the preferred embodiment, but may be applied to determining the reference positions of articulated robots other than the six-axis articulated robot and robots capable of traveling linearly, on the basis of the spirit of the present invention, in which measuring instruments are disposed at the predetermined reference positions on the jig body in correspondence to the degrees of freedom of the output end of the objective robot and the reference position of each axis of the output is determined by the measuring instruments accordingly. Furthermore, the measuring instruments may be of any suitable type other than dial gauges.

As is apparent from what has been described hereinbefore, the present invention enables the reference positions of the output end of an industrial robot with respect to the fixed base of the same to be determined by the use of a single jig. Thus the present invention provides a method and a device for determining the reference positions of an industrial robot simply and highly accurately.

We claim:

1. A method for determining the reference positions of an industrial robot having a fixed base and a wrist front section interlocked with the fixed base through a motion system and having a plurality of degrees of freedom of motion relative to the fixed base, said method comprising the steps of:
    forming detum surfaces in the fixed base;
    attaching a reference position determining device;
    setting reference positions of the wrist front section for motions in a plurality of directions, corresponding to the degrees of freedom, to the fixed base on the datum surfaces by a plurality of setting means of said reference position determining device, the number of said setting means being equal to the number of degrees of freedom of motion;
    providing the wrist front section with a gradual motion toward a position where the wrist front section is in contact with each of the setting means for setting reference positions so as to be in alignment with the reference positions; and
    giving information to the industrial robot to obtain the reference positions with respect to the directions of motion corresponding to the degrees of freedom of motion of the wrist front section.

2. A device for determining the reference positions of an industrial robot having a fixed base, a movable robot unit including a movable body mounted on the fixed base and robot arms, and a wrist front section arranged at the extremity of said movable robot unit and having a plurality of degree of freedom relative to the fixed base, said device comprising:
    a reference position determining jig body located fixedly on datum surfaces formed in the fixed base; and
    a plurality of reference positioning means for determining the reference positions of said wrist front section with respect to the directions of motion relative to the fixed base corresponding to the degrees of freedom of motion, said plurality of reference positioning means being disposed at reference positions on the jig body corresponding to the degrees of freedom of said wrist front section, the number of said reference positioning means being equal to the number of degrees of freedom of motion.

3. A device for determining the reference positions of an industrial robot according to claim 2, wherein said reference positioning means are measuring means.

4. A device for determining the reference positions of an industrial robot according to claim 3, wherein said measuring means are dial gauges.

5. A device for determining the reference positions of an industrial robot according to claim 3, further comprising a master gauge for calibrating measuring graduations of said measuring means with respect to said jig body.

6. A device for determining the reference positions of an industrial robot according to claim 2, wherein said reference position determining jig body has a plurality of plate surfaces extending perpendicularly to each other and is formed as a bracket structure having surfaces by which said bracket structure is mounted on the fixed base of said industrial robot.

* * * * *